United States Patent [19]

Kitamura et al.

[11] Patent Number: 5,335,092
[45] Date of Patent: Aug. 2, 1994

[54] CONTACT TYPE IMAGE SENSOR

[75] Inventors: Koichi Kitamura; Hidenori Mimura; Kazuo Yamamoto; Yasumitsu Ohta; Kazuyoshi Sai; Youichi Nagatake, all of Kawasaki, Japan

[73] Assignee: Nippon Steel Corporation, Tokyo, Japan

[21] Appl. No.: 982,419

[22] Filed: Nov. 27, 1992

Related U.S. Application Data

[63] Continuation of Ser. No. 504,602, Apr. 4, 1990, abandoned.

[30] Foreign Application Priority Data

Apr. 6, 1989 [JP] Japan .................. 1-88539
Oct. 30, 1989 [JP] Japan ................. 1-282506

[51] Int. Cl.⁵ ........................................ H04N 1/04
[52] U.S. Cl. ............................... 358/482; 250/208.1; 348/294
[58] Field of Search ............. 358/482, 213.11, 213.13; 250/208.1

[56] References Cited

U.S. PATENT DOCUMENTS 4,604,527 8/1986 Chenevas-Paule et al. ... 358/213.11
4,660,095 4/1987 Cannella et al. ............. 358/482
4,714,836 12/1987 Kitamura et al. ............ 358/213.11
4,764,682 8/1988 Swartz ....................... 358/213.11

*Primary Examiner*—Edward L. Coles, Sr.
*Assistant Examiner*—Thomas L. Stoll
*Attorney, Agent, or Firm*—Steven M. Rabin

[57] ABSTRACT

A contact type image sensor including a plurality of photodiodes for converting a light signal into an electric signal according to the intensity of the light and a plurality of blocking diodes, arranged in either a back-to-back or a front-to-front connection with the photodiodes, for functioning as switching elements to have the information stored on the photodiodes read out, and adapted to be driven by a matrix drive system. For a back-to-back connection of the blocking diodes and photodiodes, a control circuit maintains the potential difference between cathodes of the photodiodes at zero volts at all times. Similarly, for a front-to-front connection of the blocking diodes and photodiodes, a control/drive circuit maintains the potential difference between the anodes of the photodiodes at zero volts at all times. Since the potential difference between the cathodes (for the back-to-back connection) or anodes (for the front-to-front connection) of all of the photodiodes is always maintained at zero volts, crosstalk at crossover portions between output lines connected to the photodiodes is reduced.

3 Claims, 7 Drawing Sheets

CONTACT TYPE IMAGE SENSOR

This application is a Continuation of application Ser. No. 07/504,602, filed Apr. 4, 1990, abandoned.

BACKGROUND OF THE INVENTION

1. Field of the Invention

The present invention relates to a contact type image sensor capable of reading an original without contracting it and for use in a small size facsimile equipment or the like.

2. Description of the Prior Art

Since a contact type image sensor is capable of reading an original without using a contracting optical system, it has a shorter optical path and it can be miniaturized. Therefore, it is nowadays widely used in such reading apparatuses as small size facsimile equipment and bar code readers.

While there are various types of contact type image sensors in use, the below described contact type image sensor is arranged such that electric charges stored on its plurality of photodiodes by photoelectric transfer are sequentially read out by means of its blocking diodes functioning as switching elements. Since the photoelectric transfer element and the switching element constituting each sensor element of such a contact type image sensor are formed of diodes of the same structure, it is possible to achieve high packaging density of the sensor elements and simplification of the manufacturing process.

However, for a contact type one-dimensional image sensor to read an original, it is required that the sensor is as long as the size of the original. For example, supposing sensor elements are used at the density of 8 elements/mm, virtually close to 2000 elements are required for reading an original in A-4 size. To read pieces of information stored on these sensor elements, matrix driving is frequently used. Matrix driving is frequently used also a contact type two-dimensional image sensor for reading pieces of information stored on a still larger number of sensor elements used therein.

In arranging a matrix drive system in the contact type image sensor, however, there are formed crossover portions (non-contact portions) where a plurality of electrode circuits and another plurality of electrode circuits make two-level crossings. Since there is interposed an insulator of silicon oxide or the like between one electrode and the other electrode at the crossover portion, the crossover portion functions as a capacitor and, thus, each of the crossover portions introduces stray capacitance. Further, since a great number of the crossover portions are formed in the contact type image sensor with a matrix-drive system, there has been a problem that the response of the sensor elements becomes slow or crosstalks are produced between diodes due to the capacitance existing at the crossover portions.

SUMMARY OF THE INVENTION

The present invention was made in view of the situation as described above. Accordingly, a primary object of the present invention is to provide a contact type image sensor which can be driven fast and in which crosstalk at its crossover portions are prevented from occurring.

The structure according a first embodiment of the present invention, in a contact type image sensor comprising a plurality of photodiodes for converting a light signal into an electric signal according to the intensity of the light and a plurality of blocking diodes, arranged in back-to-back connection with the photodiodes, for functioning as switching elements to have the information stored on the photodiodes read out and adapted to be driven by a matrix drive system, further comprises first control means for maintaining the potential difference between cathodes of the plurality of photodiodes at zero voltage at all times.

The structure of the first embodiment of the present invention, further comprises second control means for maintaining the potential difference between the cathode side of the photodiodes and the cathode side of the blocking diodes at zero volts during the storage period that the photodiodes store information.

According to the present invention with the above described structure, the potential difference between the cathodes of the plurality of photodiodes is always maintained at zero volts by the first control means, crosstalk at crossover portions between cathodes of the photodiodes are reduced so that the MTF (Modulation Transfer Function) of the image sensor is improved and fast driving of the same is made possible. Further, since the voltage between the electrodes at the crossover portion is zero, the withstand voltage of the interlayer insulating film at the crossover portion can be low and, hence, the fabrication of the sensor becomes easy.

Further, by the provision of the second control means for maintaining the potential difference between the cathode side of the photodiodes and the cathode side of the blocking diodes at zero voltage during the storage period that the photodiodes store information, even when there are formed crossover portions between the electrodes on the cathode side of the photodiodes and the electrodes on the cathode side of the blocking diodes as with a contact type two-dimensional image sensor, for example, crosstalk occurring at these crossover portions can be reduced.

The present invention includes, in addition to the above-described first embodiment with the photodiode and the blocking diode in back-to-back connection a second embodiment with the photodiode and the blocking diode in front-to-front connection. More specifically, the structure according to the second embodiment, in a contact type image sensor comprising a plurality of photodiodes for converting a light signal into an electric signal according to the intensity of the light and a plurality of blocking diodes, arranged in front-to-front connection with the photodiodes, for functioning as switching elements to have the information stored on the photodiodes read out and adapted to be driven by a matrix drive system, further comprises third control means for maintaining potential difference between anodes of the plurality of photodiodes at zero volt at all times.

The structure in this second embodiment further comprises fourth control means for maintaining the potential difference between the anode side of the photodiodes and the anode side of the blocking diodes at zero volts during the storage period that the photodiodes store information.

According to the second embodiment (electrical signals corresponding to the intensity of light received by the photodiodes) of present invention it is made possible to reduce the crosstalk at the crossover portions the same as with the first embodiment of the invention.

The present invention, in order to further reduce the effect of the crosstalk occurring at the crossover portions, in both the first and second embodiments integration means for integrating the output signal of the photodiode and control means to allow the integration means to start its operation at the start times of the driving pulses and complete the operation at latest by the end times of the driving pulses.

DESCRIPTION OF THE PREFERRED EMBODIMENTS

An embodiment of the present invention will be described below with reference to FIG. 1 to FIG. 4.

Figure 1:
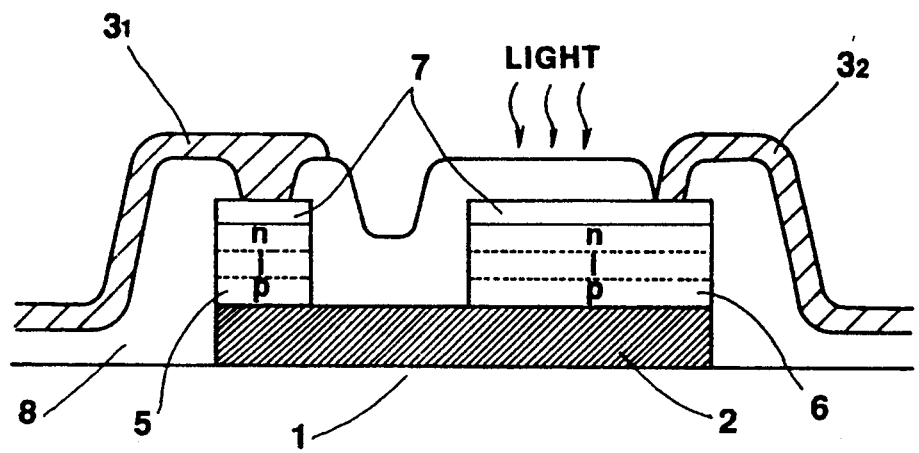
FIG. 1 a schematic sectional view of a sensor element within a contact type image sensor as a first embodiment of the present invention.

FIG. 1 is a schematic sectional view of a sensor element of a contact type image sensor as an embodiment of the present invention. The sensor element shown in the figure is that includes a substrate of an insulating material, i.e., a glass substrate 1, for example, a lower electrode 2 formed on the glass substrate 1, a blocking diode 5 and a photodiode 6 formed on the lower electrode 2, an upper electrode $3_1$ for driving the blocking diode 5, and an upper electrode $3_2$ for taking out electric charges stored on the photodiode 6. On the lower electrode 2, there is formed the blocking diode 5 of a pin structure on the left side and the photodiode 6 of the same structure on the right side. To the top portions thereof are bonded the upper electrodes 3 with a transparent conducting layer 7 formed of ITO (Indium Tin Oxide) or the like interposed therebetween. Denoted by reference numeral 8 is an insulating layer (made, for example, of silicon oxide) for insulating one sensor element from another adjoining thereto.

The sensor element of the described structure has the blocking diode 5 and photodiode 6 formed on the same lower electrode 2 in the order of p-, i-, and n-regions from the bottom up and, hence, it is easy to form the sensor element with these diodes in back-to-back connection and it is possible to simplify its manufacturing process. Further, since the blocking diode 5 and the photodiode 6 are separated from each other, even if the blocking diode 5 and photodiode 6 are formed of the diode of a pin structure using an a-Si film, a crosstalk between the devices (lateral movement of the generated carriers) does not occur. Besides, since the light from a light source disposed on the back side of the sensor element, not shown, can be introduced also through the portion between adjoining sensor elements, the sensor element can be placed closer to an original than with the prior art contact type image sensor.

Figure 3:
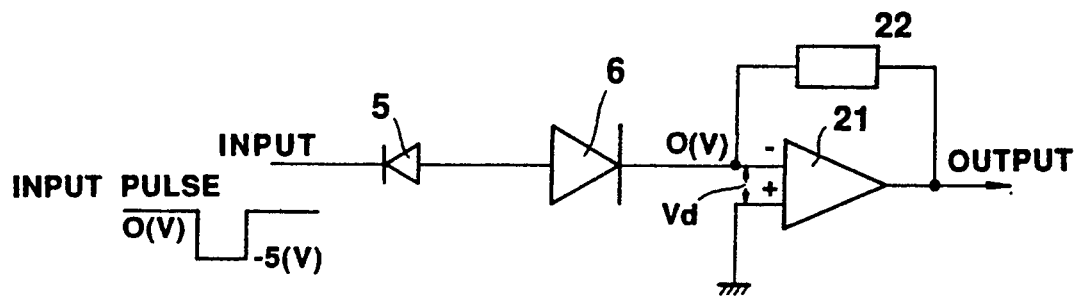
FIG. 3 is a detailed drawing of a control portion corresponding to one sensor element in the above image sensor.
Figure 2:
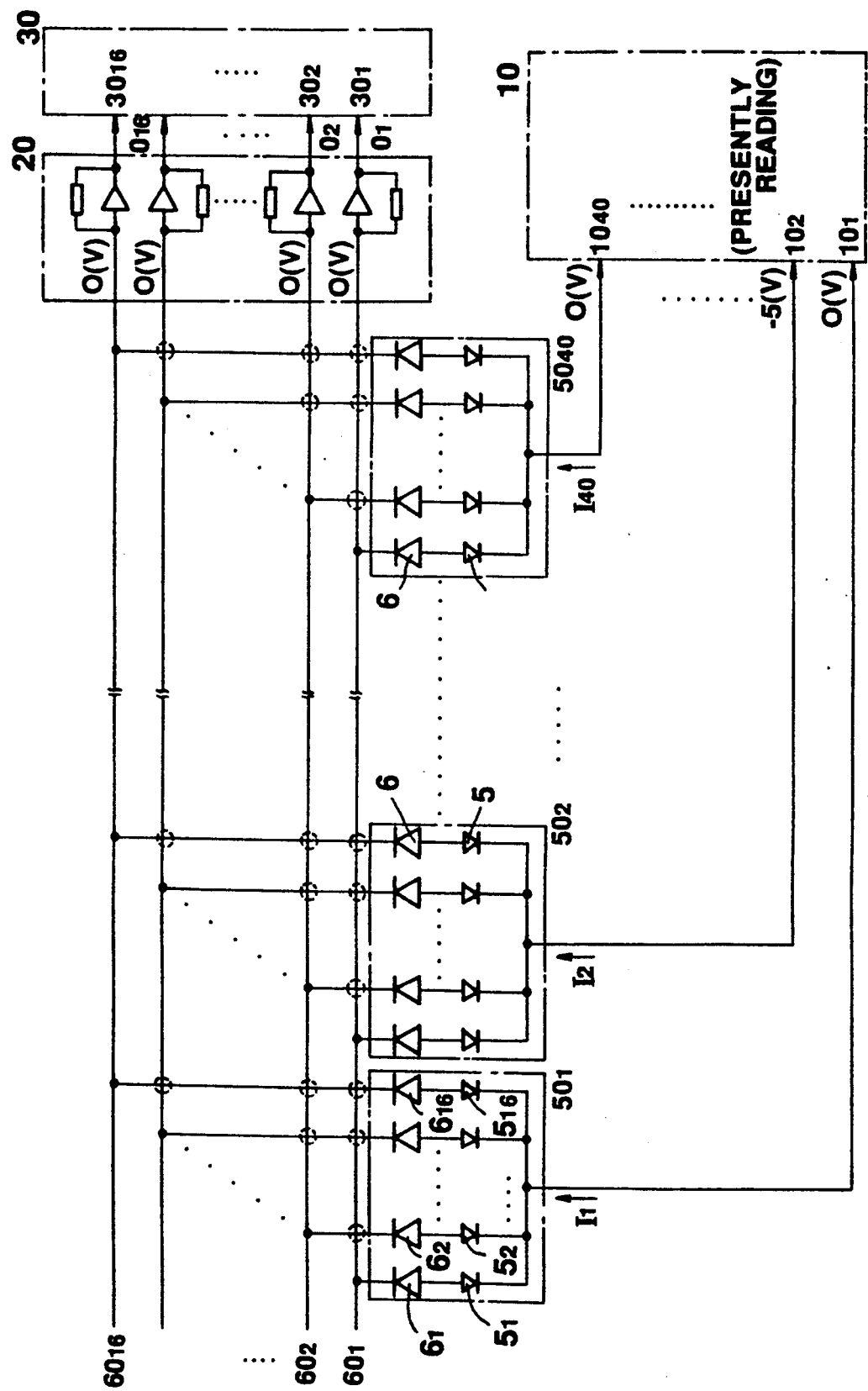
FIG. 2 is a circuit diagram of the contact type one-dimensional image sensor as the first embodiment of the present invention.

FIG. 2 is a circuit diagram of a contact type one-dimensional image sensor as a first embodiment of the present invention and FIG. 3 is a detailed drawing of a control portion corresponding to one sensor element of the image sensor of FIG. 2. The contact type one-dimensional image sensor according to the present embodiment includes sensor portions $50_{1-40}$ each having 16 sensor elements, control/drive portions $10_{1-40}$ (matrix drive systems 10) control portions (first control means) $20_{1-16}$, reading portions $30_{1-16}$, and 16 line electrodes $60_{1-16}$. Each sensor portion $50_{1-40}$ is formed of 16 sensor elements, each of which is made up of a blocking diode 5 and photodiode 6 in back-to-back connection, with the 16 photodiodes 6 connected with the 16 line electrodes $60_{1-16}$, respectively. Hence, each line electrode is connected with 40 photodiodes 6 corresponding to the number of the sensor portions $50_{1-40}$. The control/drive portions 10, during the reading period that the information stored on the photodiodes 6 is read, supply the inputs of blocking diodes 5 with a pulse of $-5$ V and, during the period of storing information, control the cathode side (input) of the blocking diodes 5 to be kept at 0 V. The control portion 20 is formed of an operational amplifier 21 and a feedback impedance 22 and maintains the cathode side of the photodiode 6 at 0 V. The reading portions 30 reads the information coming from the photodiodes 6.

When driving pulses $I_{1-40}$ are supplied from the control/drive portions $10_{1-40}$ sequentially to the blocking diodes 5 of the sensor portions $50_{1-40}$, the reading portions $30_{1-16}$ can obtain 40 sequential output signals $0_{1-16}$. The portion encircled by a dotted-line circle indicates a crossover portion where an electrode circuit makes a two-level crossing with another electrode circuit.

Now, operation of the contact type one-dimensional image sensor of the present embodiment will be described. When light from an original, not shown, falls on the photodiodes 6, the photodiodes 6 convert the light signals into electric signals and store them. The control/drive portions 10 sequentially supply the blocking diodes 5 of the sensor portions $50_{1-40}$ with the pulses of $-5$ V by means of its 1st to 40th control/drive portions $10_{1-40}$, thereby enabling the photodiodes 6 to be read which are in back-to-back connection with the blocking diodes 5 supplied with the voltage of $-5$ V, and, on the other hand, the same supply 0 V to the cathode side of the other blocking diodes 5, thereby enabling the corresponding photodiodes 6 to make storing operation. Each of the reading portions $30_{1-16}$ reads the electric signal stored on each of the photodiodes 6 through each of the control portions $20_{1-16}$.

Figure 4:
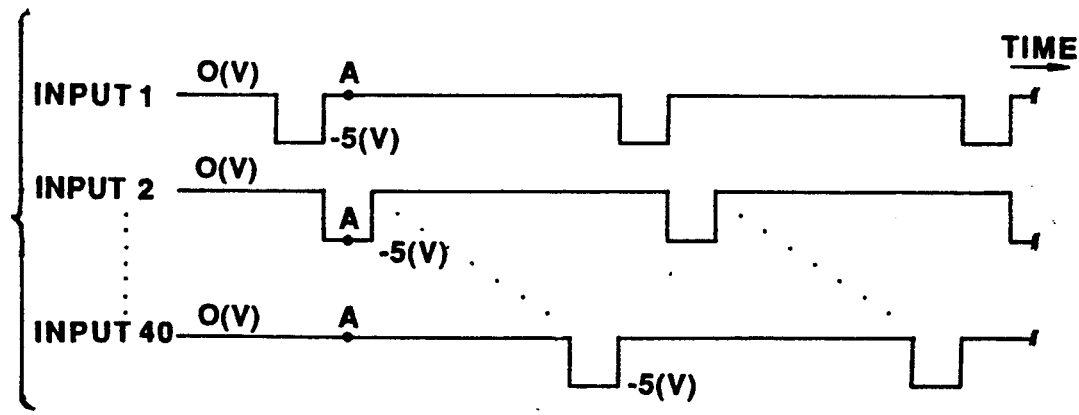
FIG. 4 is a timing chart for explaining operation of the contact type one-dimensional image sensor of the above embodiment.

FIG. 4 is a timing chart for explaining operation of the contact type one-dimensional image sensor of the present embodiment. At the present time point A in the timing chart shown in FIG. 4, the control/drive portion $10_2$ is supplying "$-5$ V". Hence, the blocking diodes 5 of the sensor portion $50_2$ in connection with the control/drive portion $10_2$ are brought to ON states whereby the information stored on the photodiodes 6 in connection with the control/drive portion $10_2$ are enabled to be read out. In the described states, the reading portions 30 read out the pieces of information stored on the 16 photodiodes 6 within the sensor portion $50_2$ brought to the readable states by the control/drive portions $10_2$ at a time by means of its reading portions $30_{1-16}$. Meanwhile, the blocking diodes 5 in connection with the remaining control/drive portion $10_1$ and control/drive portions $10_{3-40}$ are brought to OFF states and the photodiodes 6 connected thereto make the storing operation. Then, the photodiodes 6 in connection with the control/drive portion $10_3$ are brought to readable states, and then, in like manner, the photodiodes 6 in the successive sensor portions 50 are brought to readable states so that pieces of information stored on the photodiodes 6 in these sensor portions 50 are read out by the reading portion 30.

Since the operational amplifier 21 of the control portion 20 has applied to a negative feedback control signal through the feedback impedance 22, the differential input voltage Vd is held at 0 V by the phenomenon of imaginal shorting and, hence, the cathode side (output) of the photodiode 6 is held at 0 V at all times. The control/drive portion 10 supplies $-5$ V to the cathode side of the blocking diodes 5 for the photodiodes 6 which will be presently read and, on the other hand, it maintains the potential of the cathode side of the blocking diodes 5 for the photodiodes 6 which make storing operation at 0 V. Thus, at the timing of the point A in FIG. 4, the cathode side of the blocking diodes 5 connected with control/drive portions other than the control/drive portion $10_2$ and the cathode side of all the photodiodes 6 are maintained at 0 V by means of the control/drive portions 10 and the control portions 20. Hence, even if there is existing stray capacitance at the crossover portions, the stray capacitance at the crossover portions does not affect the operation of the circuit, because there is no potential difference there between the electrodes. Thus, in the contact type one-dimensional image sensor of the present embodiment, most of the stray capacitance existing at the crossover portions does not affect the operation of the circuit, and therefore, a crosstalk between the photodiodes 6 can be prevented and, in addition, a delay in response speed of the sensor due to the stray capacitance can be prevented, thereby enabling high speed drive to be made. Since the interelectrode voltage at the crossover portions is 0 V, the withstand voltage of the interlayer insulating film can be low, which makes fabrication of the device easy and makes it inexpensive.

With the above described embodiment, the present inventors conducted experiments by driving a sensor 80 mm long, with 40 shift registers disposed on the input side and with 16 operational amplifiers disposed on the output side, at a speed as high as one line per 1.0 msec (the input pulse width being approximately $24\mu$ sec), and obtained such a good result that the S/N ratio being over 35 dB.

In the embodiment shown in FIG. 1 to FIG. 4, the case where the potential on the cathode side of the photodiodes 6 was maintained at 0 V was described, but the present invention is not limited to such an arrangement. That is, it is not always necessary to maintain the potential on the cathode side of the photodiodes 6 at 0 V, but the purpose is met only by maintaining the potential difference between the plurality of photodiodes 6 at 0 V. Namely, the arrangement to maintain the potential on the cathode side of the photodiodes 6 at 0 V is only one example of the embodiment.

Figure 5:
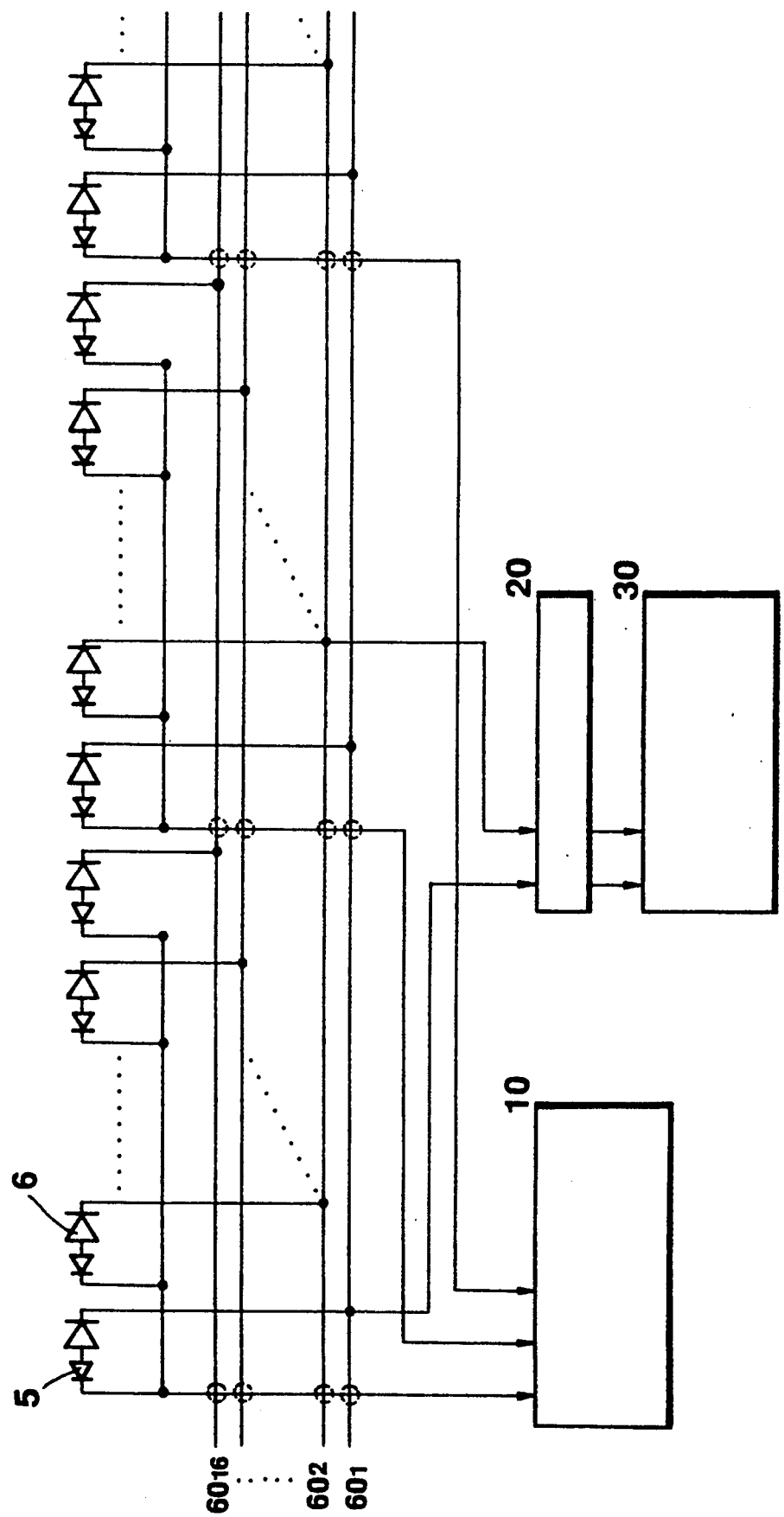
FIG. 5 is a circuit diagram of another example of contact type one-dimensional image sensor.

Now, in the above embodiment in which the electrodes on the cathode side of the photodiodes 6 and the electrodes on the cathode side of the blocking diodes 5 are led out in opposite directions, since the electrodes on the cathode side of the blocking diodes 5 have no crossover portions, it is not always necessary to maintain the potential on the cathode side of the blocking diodes 5 at the same potential as that of the cathode side of the photodiodes 6, that is, 0 V. In contrast with this, when the electrodes on the cathode side of the photodiodes 6 and the electrodes on the cathode side of the blocking diodes 5 are led out in the same direction as in a contact type one-dimensional image sensor shown in FIG. 5, there are present crossover portions of the electrodes on the cathode side of the blocking diodes 5 and the electrodes on the cathode side of the photodiodes 6 (the portions encircled by dotted-line circles). In this case, by maintaining the electrodes on the cathode side of the blocking diodes 5 at 0 V during the storage period that the photodiodes 6 store information, it is made possible to bring the potential difference between the cathode side of the photodiodes 6 and the cathode side of the blocking diodes 5 to 0 V, whereby occurrence of crosstalk at the crossover portions can be prevented.

Figure 6:
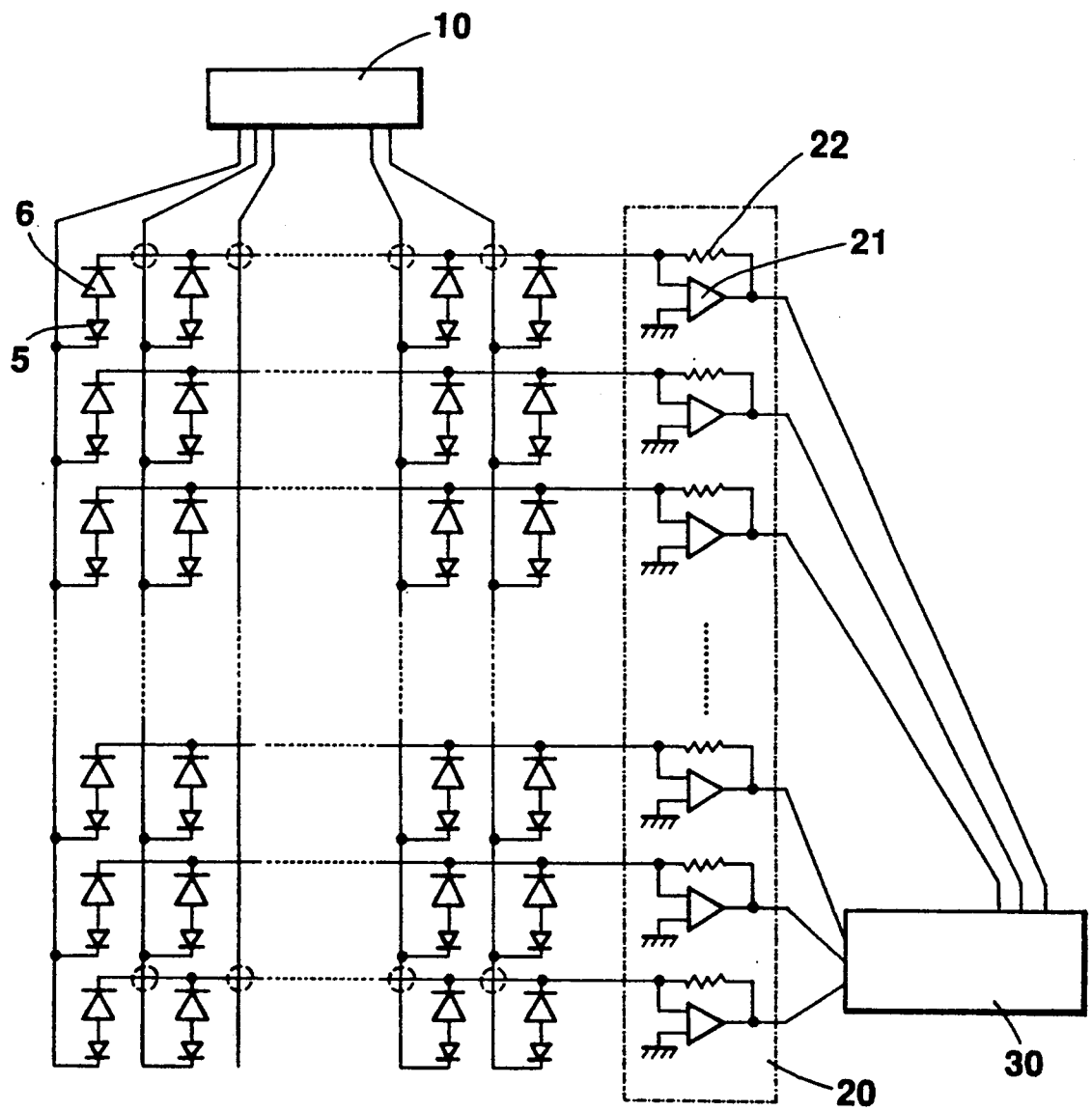
FIG. 6 is a circuit diagram of a contact type two-dimensional image sensor.

FIG. 6 is a circuit diagram of a contact type two-dimensional image sensor. Also in the case of the contact type two-dimensional image sensor of FIG. 6, there are present, the same as with the contact type one-dimensional image sensor of FIG. 5, crossover portions between electrodes on the cathode side of the photodiodes 6 and the electrodes on the cathode side of the blocking diodes 5 (portions encircled by dotted-line circles in FIG. 6). Hence, also in this case, by maintaining the electrodes on the cathode side of the blocking diodes 5 at 0 V during the storage period, the potential difference between the cathode side of the photodiodes 6 and the cathode side of the blocking diodes 5 can be brought to 0 V, whereby crosstalk at the crossover portions can be prevented from occurring.

Figure 7:
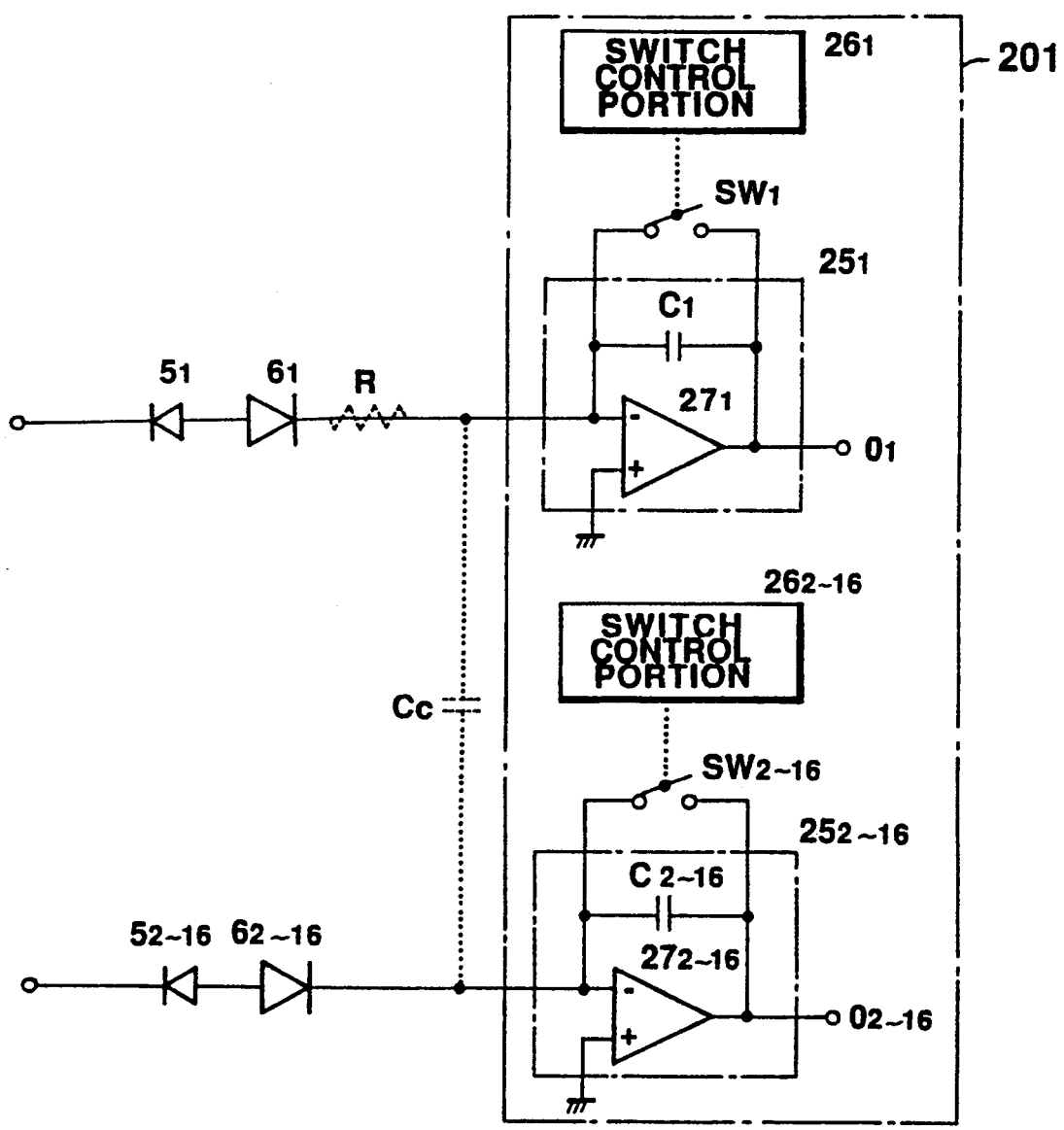
FIG. 7 is a drawing showing a variation of the control portion.

FIG. 7 is a diagram showing a variation of the control portion. The control portion 201 of the present variation is formed by providing a control portion 201 in place of the control portions 20 shown in FIG. 2 and FIG. 3. The control portion 201 according to this variation is formed of an integrator 25, a switch SW in parallel connection with the integrator 25, and a switch control portion 26. The parts having the same function as those shown in FIG. 1 and FIG. 2 are denoted by corresponding reference numerals and detailed explanation of the same is omitted.

The integrator 25 is formed of an operational amplifier 27 and a capacitor C.

Each switch control portion 26 is adapted to control the switch SW to be turned OFF at the fall (starting time) of the driving pulse supplied to the blocking diodes 5 and control the switch SW to be turned ON slightly before the timing of the rise (ending time) of the driving pulse.

Supposing now that the original is white only at the portion corresponding to the photodiode $6_1$ of the sensor portion $50_1$ and black at other portions, the output signals from the cathodes of the photodiodes 6 are supplied to the inverting input terminals of the operational amplifiers 21 for inverting amplification, and thereby, a signal is output only to the reading portion $30_1$ connected with the photodiode $6_1$. However, if there remains crosstalk resulting from stray capacitance at a crossover portion, a false signal due to capacitance $C_c$ at the crossover portion is output from another photodiode 6, for example, photodiode $6_{2-16}$. The false signal appearing at the output of the photodiode $6_{2-16}$ is that produced by a differential circuit formed of resistance R intrinsic to the circuit and the capacitance $C_c$ (indicated by dotted lines in FIG. 7) and is considered to have a differential waveform. In fact, according to measurements made by the present inventors using an oscilloscope, the false signal appearing at the output of the photodiode $6_{2-16}$ showed a differential waveform.

Therefore, the unwanted fault signal from the photodiode 6 can be eliminated by integrating the output signal from the photodiode 6.

Figure 8:
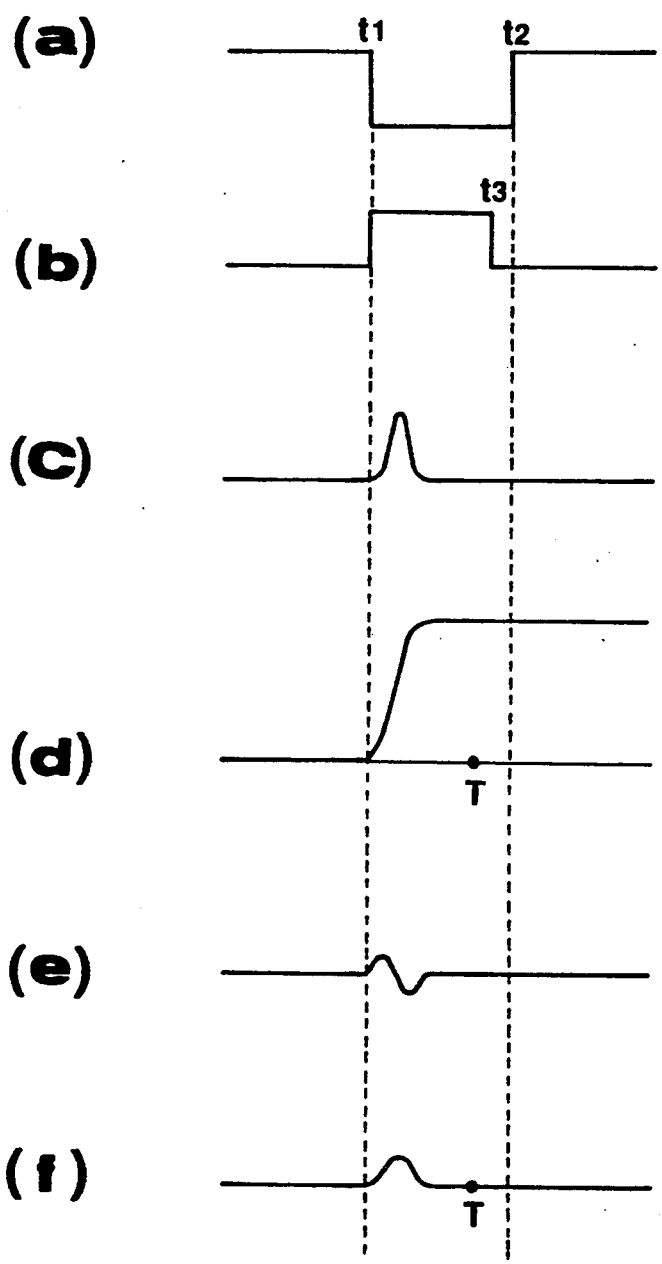
FIG. 8 is a timing chart for explaining operation of the variation.

Now, a variation of such an operation will be described in detail with reference to FIG. 8. FIG. 8 is a timing chart for explaining the present variation, in which FIG. 8(a) shows a waveform of the driving pulse, FIG. 8(b) shows an operating timing waveform of the integrator, FIG. 8(c) shows an output signal of the photodiode $6_1$ after undergoing the inverting amplification, FIG. 8(d) is an integrated waveform of the output signal of the photodiode $6_1$, FIG. 8(e) is an output waveform of the photodiode $6_{2-16}$, other than the photodiode $6_1$, after undergoing the inverting amplification, and FIG. 8(f) is an integrated waveform of the output signal of the photodiode $6_{2-16}$. When the driving pulse $I_1$ as shown in FIG. 8(a) is supplied to the blocking diodes $5_{1-16}$, the switch control portions $26_{1-16}$ turn OFF the switches SW connected in parallel with the integrators 25 at the timing $t_1$ of the fall of the driving pulse $I_1$ and turn ON the switches SW at the timing $t_3$ slightly before the timing $t_2$ of the rise of the driving pulse $I_1$. The reason why the timing at which the switch is turned ON is set slightly before the timing at which the driving pulse ends is because it is intended to have the charges stored on the capacitor C within the integrator 25 discharged so that the circuit is reset before the next driving pulse $I_1$ arrives.

When the driving pulse $I_1$ is supplied to the blocking diodes $5_{1-16}$, the output signal of the photodiode $6_1$ after undergoing the inverting amplification is a pulse signal as shown in FIG. 8(c), but the output signal $0_1$ of the integrator 25 becomes an integrated signal as shown in FIG. 8(d). At this time, the output waveform of the photodiode $6_{2-16}$ after undergoing the inverting amplification becomes a differential waveform of FIG. 8(c) as shown in FIG. 8(e), but the output signal $0_{2-16}$ of the integrator $25_{2-16}$ becomes after the integration as shown in FIG. 8(f) and it is finally reduced to zero.

Thus, the integrated waveform shown in FIG. 8(f) becomes zero. By arranging, for example, such that the output signal is taken out at the timing T, even if there should remain an unwanted fault signal due to the capacitance $C_c$ at a crossover portion in the output signal, such a fault signal can be reliably eliminated and it is made possible to obtain an output signal with only the true signal component integrated.

By providing the control portion 201 as described above, even if an unwanted fault signal due to crosstalk at a crossover portion should be delivered as the output signal, such a fault signal can be reliably eliminated. Further, the output of the photodiode 6 was conventionally taken out at the time of its peak and such an output signal was sampled and held and, hence, it was difficult to take the timing of the sampling and holding. But, in the present embodiment, the timing is taken very easily because what is to be sampled and held is the integrated value.

When the present inventors read an original at the line density of 4 p/mm, using the present embodiment with the element density at 8 dots/mm and with the use of a SELFOC lens, the MTF, which had been 30% in the prior art, was so much improved as to 60%.

Although the above variation was explained as to its application to a contact type one-dimensional image sensor, the resolution can be improved equally when it is applied to a contact type two-dimensional image sensor.

While the present invention has been described above as related to the embodiments of contact type image sensor shown in FIG. 1 to FIG. 8 comprising a plurality of photodiodes and a plurality of blocking diodes arranged in back-to-back connection and adapted to be driven by a matrix drive system, the present invention further includes a contact type image sensor comprising a plurality of photodiodes and a plurality of blocking diodes arranged in front-to-front connection and adapted to be driven by a matrix drive system.

Figure 9:
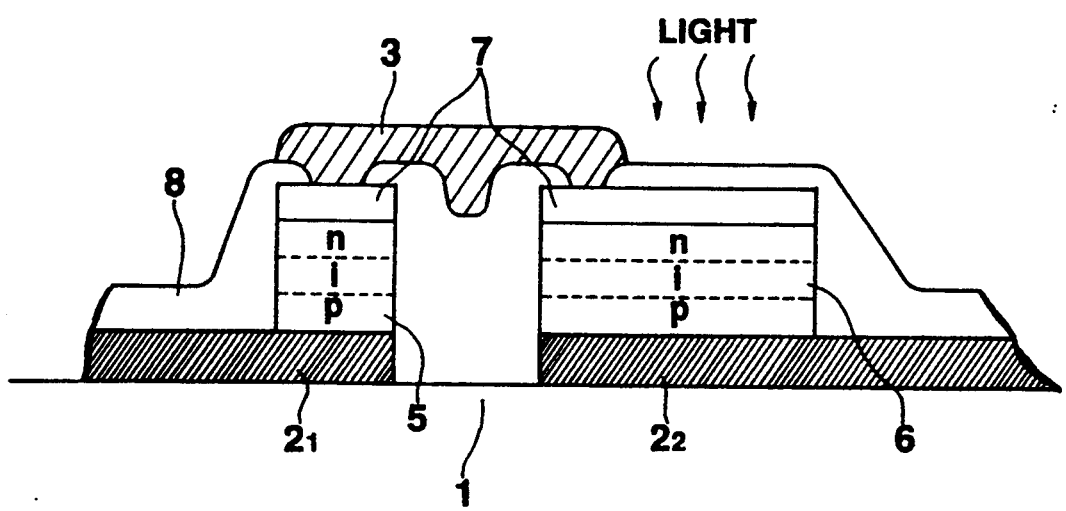
FIG. 9 is a schematic sectional view of an embodiment of a contact type image sensor in which a photodiode and a blocking diode are arranged in front-to-front connection.
Figure 10:
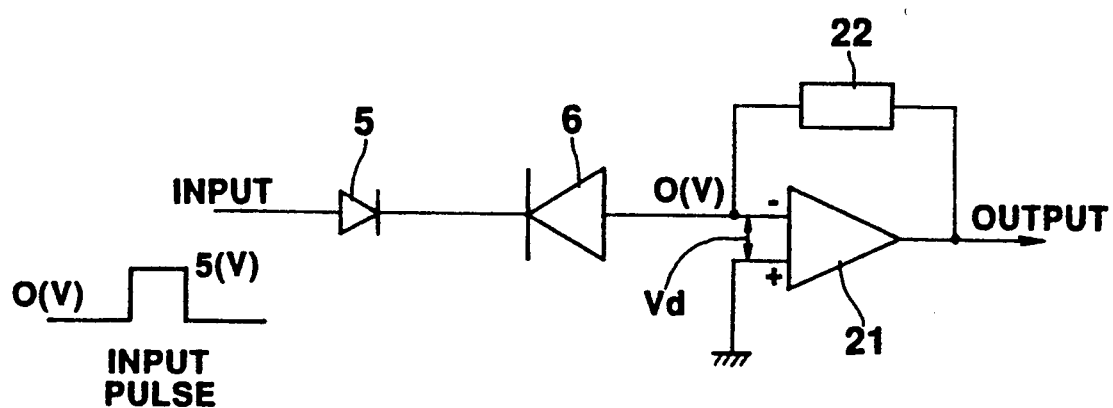
FIG. 10 is a detailed drawing of a control portion corresponding to one sensor element in the above image sensor.

For example, FIG. 9 shows a schematic sectional view of a sensor element of a contact type image sensor as the embodiment in which the photodiodes and the blocking diodes are arranged in front-to-front connection. FIG. 10 is a detailed drawing showing a control portion corresponding to one sensor element therein.

FIG. 9 shows an embodiment, in which separate lower electrodes $2_1$ and $2_2$ are formed on a glass substrate 1 and a blocking diode 5 and a photodiode 6 are formed on the lower electrodes $2_1$ and $2_2$, respectively, and there is formed an upper electrode on the blocking diode 5 and a photodiode 6 to connect these with each other. The blocking diode 5 and a photodiode 6 are each formed such that the p-, i-, and n-regions thereof are arranged in the order named from the bottom up and both the diodes are connected through the upper electrode 3, whereby the cathodes of both the diodes are connected and the front-to-front connection is achieved. The lower electrode $2_1$ serves as the anode side (input) of the blocking diode 5 and drives the blocking diode 5 upon being supplied with a pulse of +5 V shown in FIG. 10. The lower electrode $2_2$ serves as the anode side (output) of the photodiode 6 and the charges stored on the photodiode 6 is taken out through this lower electrode $2_2$. Parts having the same functions as those shown in FIG. 1 and FIG. 3 are denoted by corresponding reference numerals and detailed description thereof is omitted.

The present invention can be applied also to the contact type image sensor in front-to-front connection shown in FIG. 9 and FIG. 10, and the control portion which reduces crosstalk occurring at crossover portions still further can also be applied to the image sensor in front-to-front connection.

Thus, a contact type image sensor with a plurality of photodiodes for converting a light signal into an electric signal according to the intensity of the light and a plurality of blocking diodes, is arranged according to this embodiment in front-to-front connection with the photodiodes, for functioning as switching elements to have the information stored on the photodiodes read out and adapted to be driven by a matrix drive system. The contact type image sensor of this embodiment further comprises a control means for maintaining the potential difference between anodes of the plurality of photodiodes at zero volts at all times.

This embodiment also includes a control means for maintaining the potential difference between the anode side of photodiodes and the anode side of the blocking diodes at zero volts during a storage period that the photodiodes store information.

What is claimed is:

1. A contact type image sensor, comprising:

a plurality of photodiodes and a plurality of blocking diodes, the photodiodes and blocking diodes being arranged in back-to-back connection to form a plurality of sensor elements, each sensor element including one back-to-back connected photodiode and blocking diode;

a plurality of crossing, electrically conductive lines arranged in a matrix pattern and connected to the cathodes of the photodiodes and to each other, the lines, where they cross, defining stray capacitances, the sensor elements read out through said lines in response to being driven by a matrix drive system; and means for controlling the voltage on the cathodes of all of the photodiodes and blocking diodes, such that the cathodes of all of the photodiodes are maintained continuously at the same voltage so as to prevent generation of crosstalk by the stray capacitances, with the voltage on the cathodes of the blocking diodes being different than the voltage maintained on the cathodes of the photodiodes.

2. A contact type image sensor, comprising:

a plurality of photodiodes and a plurality of blocking diodes, the photodiodes and blocking diodes being arranged in front-to-front or back-to-back connection to form a plurality of sensor elements, each sensor element including an input on the blocking diode and an output on the photodiode;

a plurality of crossing, electrically conductive lines arranged in a matrix pattern and connected to the outputs on the photodiodes and to each other, the lines, where they cross, defining stray capacitances, the sensor elements read out through said lines in response to being driven by a matrix drive system connected to the inputs on the blocking diodes; and means for controlling the voltage on the outputs of all of the photodiodes and the inputs of all of the blocking diodes, such that the outputs on all of the photodiodes are maintained continuously at the same voltage so as to prevent generation of crosstalk by the stray capacitances, with the voltage on the inputs of the blocking diodes being different than the voltage maintained on the outputs of the photodiodes.

3. A contact type image sensor according to claim 2, wherein the photodiodes and blocking diodes are arranged in front-to-front connection and the inputs and outputs are respectively the anodes of the blocking diodes and the anodes of the photodiodes.

* * * * *